United States Patent
Kim et al.

(10) Patent No.: US 7,282,984 B2
(45) Date of Patent: Oct. 16, 2007

(54) SEMICONDUCTOR DEVICE HAVING AN INTERNAL VOLTAGE CONVERTER, AND METHOD THEREFOR

(75) Inventors: Eui-Seung Kim, Yongin-si (KR); Chan-Yong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 10/889,403

(22) Filed: Jul. 12, 2004

(65) Prior Publication Data

US 2005/0017790 A1 Jan. 27, 2005

(30) Foreign Application Priority Data

Jul. 23, 2003 (KR) ............... 10-2003-0050501

(51) Int. Cl.
*G11C 5/14* (2006.01)
(52) U.S. Cl. ............... 327/530; 327/535
(58) Field of Classification Search ........... 327/530, 327/538, 540, 541, 544, 545; 323/313; 307/64, 307/66
See application file for complete search history.

(56) References Cited

U.S. PATENT DOCUMENTS

| | | | |
|---|---|---|---|
| 4,903,186 A * | 2/1990 | Pullen, Jr. ............... 363/45 |
| 5,280,455 A | 1/1994 | Kanaishi |
| 5,300,824 A * | 4/1994 | Iyengar ............... 327/540 |
| 5,712,590 A | 1/1998 | Dries et al. |
| 5,748,458 A * | 5/1998 | Ochiai ............... 363/17 |
| 6,185,139 B1 * | 2/2001 | Pantelakis et al. ........... 365/201 |
| 6,326,837 B1 | 12/2001 | Matano |
| 6,492,863 B2 * | 12/2002 | Kono et al. ............... 327/538 |
| 6,525,599 B2 * | 2/2003 | Nguyen et al. ............... 327/544 |
| 6,856,173 B1 * | 2/2005 | Chun ............... 326/108 |
| 2003/0057931 A1 | 3/2003 | Di Iorio |
| 2003/0099210 A1 * | 5/2003 | O'Toole et al ............... 370/311 |
| 2003/0151957 A1 * | 8/2003 | Pekny ............... 365/189.11 |
| 2003/0226041 A1 * | 12/2003 | Palmer et al. ............... 713/202 |
| 2004/0041595 A1 * | 3/2004 | Ogawa et al. ............... 327/94 |
| 2004/0232248 A1 * | 11/2004 | Cho ............... 235/492 |
| 2004/0263133 A1 * | 12/2004 | Nguyen ............... 323/222 |

FOREIGN PATENT DOCUMENTS

| | | |
|---|---|---|
| KR | 01-55255 | 12/1998 |
| KR | 1999-0051368 | 7/1999 |

* cited by examiner

*Primary Examiner*—Kenneth B. Wells
*Assistant Examiner*—Thomas J. Hiltunen
(74) *Attorney, Agent, or Firm*—F. Chau & Assoc., LLC

(57) ABSTRACT

An internal voltage converter and method is provided capable of reducing power consumption using a selective voltage reference, a semiconductor device including the internal voltage converter. A semiconductor device uses the internal voltage converter which discriminates an IVC stand-by state from a normal operation state, selects a voltage reference with low power consumption among selective voltage references in the IVC stand-by state, and generates an internal voltage.

20 Claims, 3 Drawing Sheets

SEMICONDUCTOR DEVICE HAVING AN INTERNAL VOLTAGE CONVERTER, AND METHOD THEREFOR

This application claims priority to Korean Patent Application No. 2003-50501, filed on Jul. 23, 2003, in the Korean Intellectual Property Office, the disclosure of which is incorporated herein in its entirety by reference.

BACKGROUND OF THE INVENTION

1. Field of the Invention

The present invention relates to a semiconductor device, and more particularly, to an internal voltage converter of a semiconductor device.

2. Discussion of the Related Art

Generally, an internal voltage converter (IVC) included in a semiconductor device receives a DC voltage from an external power source, converts the DC voltage into a DC voltage level greater or smaller than the DC voltage, maintains the converted DC voltage level constant throughout operation, and supplies the converted DC voltage to an internal core block. The external power source, generated from an external voltage generator, maintains the DC input voltage constant using a plurality of devices and consumes a predetermined amount of power during this operation.

The internal DC voltage converted by the internal voltage converter and supplied to the internal core block is used as a supply voltage for driving the internal core block during normal operation mode and the internal DC voltage must be maintained constant to properly operate the internal core block. The internal core block may be a cell array block, a X-decoder block, a Y-decoder block, or a peripheral test circuit block in a semiconductor device. Or, the internal core block may be a chip for communication applications, which can be included in an IC (integrated circuit) card or smart card.

In mobile or portable devices such as cellular phones, PDA's, smart cards, etc., the internal core block and internal voltage converter of a semiconductor device consume a large percentage of the total power. Therefore, a power efficient core block and internal voltage converter facilitate a longer time of operation of the device between each battery recharge or replacement.

Many mobile devices utilize a standby mode during an idling period. In standby mode, the IVC supplies a rough or an imprecise DC voltage to the core block to maintain a previous operating state without performing any function and waits until receiving a command to resume normal operation. Since a conventional IVC of a semiconductor device receives a DC input voltage from an external reference voltage generator to generate an internal voltage irrespective of the IVC normal or stand-by modes, there is wastage in power consumption during standby mode because the external voltage generator continues to maintain the DC output voltage constant.

A need therefore exists for an internal voltage converter and method which discriminates an IVC stand-by state from a normal operation state and selects a voltage reference with low power consumption among selective voltage references in the IVC stand-by state to generate an internal voltage.

SUMMARY OF THE INVENTION

According to an aspect of the present invention, there is provided an internal voltage converter (IVC) comprising: a first reference voltage generation circuit, an analog MUX, and a voltage conversion circuit. The first reference voltage generation circuit generates a first reference voltage using a first supply voltage with a lower power than a power consumed when a second reference voltage is generated. The analog MUX outputs the second reference voltage when the IVC stand-by mode notification signal is in a first logic state, and outputs the first reference voltage when the IVC stand-by mode notification signal is in a second logic state. The voltage conversion circuit converts a level of an output voltage of the analog MUX and generates an internal voltage. The internal voltage converter further comprises a second reference voltage generation circuit, which generates the second reference voltage using a second supply voltage.

The IVC stand-by mode notification signal is maintained in the second logic state in an IVC stand-by state period appearing before entering a normal operation state after power-on or appearing in an idling state period during the normal operation state. The IVC stand-by mode notification signal is maintained in the second logic state while no power is supplied, if a power received wirelessly in a non-contact mode of the smart card has a pulse-like form when the internal voltage converter drives a core block of a smart card. The IVC stand-by mode notification signal is maintained in the second logic state in a non-contact mode of a combi-type smart card when the internal voltage converter drives a core block of the combi-type smart card. The first supply voltage is cut off when the IVC stand-by mode notification signal is in the first logic state, so that the first reference voltage generation circuit does not generate the first reference voltage. The first supply voltage is equal to the second supply voltage. The second supply voltage is cut off when the IVC stand-by mode notification signal is in the second logic state, so that the second reference voltage generation circuit does not generate the second reference voltage.

According to another aspect of the present invention, there is provided a semiconductor device comprising an internal voltage converter and a core block.

The internal voltage converter generates a first reference voltage using a first supply voltage with a lower power than a power consumed when a second reference voltage is generated, selects one of the first reference voltage or the second reference voltage in response to a logic state of an IVC stand-by mode notification signal, converts a level of the selected voltage and generates an internal voltage. The core block operates in a normal mode and in a stand-by mode by the internal voltage.

The internal voltage converter comprises a first reference voltage generation circuit, an analog MUX and a voltage conversion circuit. The first reference voltage generation circuit generates the first reference voltage using the first supply voltage. The analog MUX outputs the second reference voltage when the IVC stand-by mode notification signal is in a first logic state, and outputs the first reference voltage when the IVC stand-by mode notification signal is in a second logic state. The voltage conversion circuit converts a level of an output voltage of the analog MUX and generates an internal voltage. The internal voltage converter further comprises a second reference voltage generation circuit, which generates the second reference voltage using a second supply voltage.

According to still another aspect of the present invention, there is provided an internal voltage conversion method comprising: (a) generating a first reference voltage using a first supply voltage with a lower power than a power consumed when a second reference voltage is generated; (b) outputting the second reference voltage when the IVC stand-by mode notification signal is in a first logic state and outputting the first reference voltage when the IVC stand-by mode notification signal is in a second logic state; and (c) converting a voltage level of one of the outputted first reference voltage or the outputted second reference voltage and generating an internal voltage.

According to still yet another aspect of the present invention, there is provided a method for driving a semiconductor device, comprising: (d) generating a first reference voltage using a first supply voltage with a lower power than a power consumed when a second reference voltage is generated, selecting one of the first reference voltage or the second reference voltage in response to a logic state of an IVC stand-by mode notification signal, converting a level of the selected voltage and generating an internal voltage; and (e) operating a core block of the semiconductor device in a normal mode and in a standby-mode by the internal voltage.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EMBODIMENTS OF THE INVENTION

Hereinafter, embodiments of the present invention will be described in detail with reference to the appended drawings. The same reference numbers refer to the same components throughout the drawings.

Figure 1:
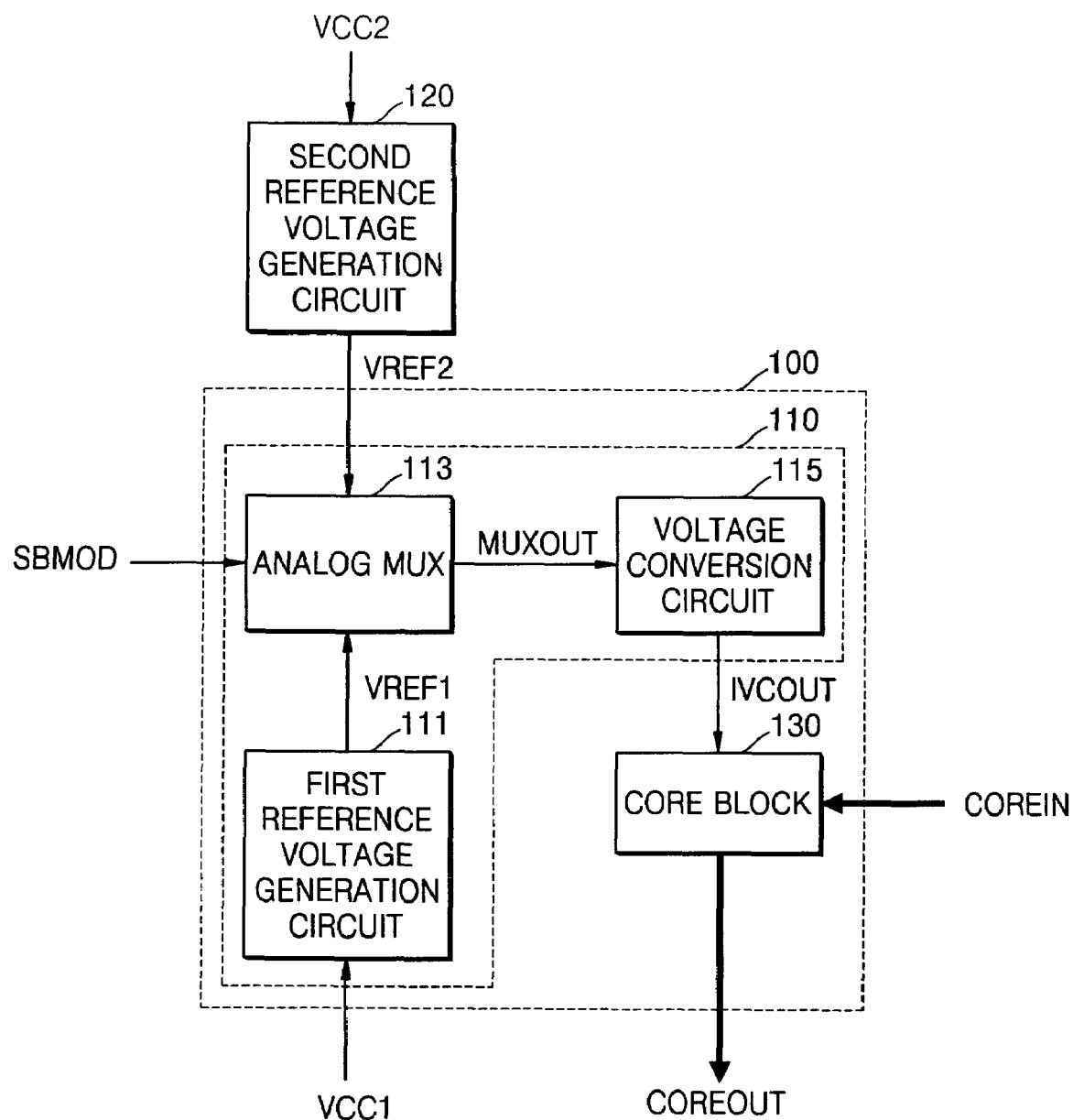
FIG. 1 is a block diagram of a semiconductor device including an internal voltage converter according to an embodiment of the present invention.

FIG. 1 is a block diagram of a semiconductor device 100 including an internal voltage converter 110 according to an embodiment of the present invention. Referring to FIG. 1, a semiconductor device 100 according to an embodiment of the present invention includes an internal voltage converter 110 and a core block 130. The internal voltage converter 110 generates a first reference voltage VREF1 using a first supply voltage VCC1. A second reference voltage VREF2 supplied from a second reference voltage generator circuit 120. The first reference voltage VREF1 or the second reference voltage VREF2 can be selected in response to a logic level of an IVC stand-by mode notification signal SBMOD. The internal voltage converter 110 outputs an internal voltage IVCOUT. The core block 130 operates in a normal mode and in an IVC stand-by mode using the internal voltage IVCOUT. In the normal mode, the core block 130 may perform a data read function, a data write function, or predetermined functions in response to an address or a control signal COREIN input for performing a specific function, and outputs predetermined data COREOUT. In the IVC stand-by mode, the core block 130 is maintained in a state without performing any function and waits for receiving a command out of standby mode or receiving/transmitting data.

The internal voltage converter 110 includes a first reference voltage generation circuit 111, an analog MUX 113 and a voltage conversion circuit 115. The internal voltage converter 110 further includes a second reference voltage generation circuit 120. The second reference voltage generation circuit 120 is supplied a voltage by a second supply voltage VCC2 to generate the second reference voltage VREF2. The second reference voltage generation circuit 120 can be installed either inside or outside of the semiconductor device 100. Further, in a case where the second reference voltage generation circuit 120 is disposed inside the semiconductor device 100, the second reference voltage generation circuit 120 can be disposed in the internal voltage converter 110.

The first reference voltage generation circuit 111 generates the first reference voltage VREF1 using a lower consumed power than at generating the second reference voltage VREF2 by the second reference voltage generation circuit 120. The second reference voltage generation circuit 120 uses devices such as a logic circuit, a differential amplifier or other circuits known to one skilled in the art to generate a second reference voltage VREF2 which is more stable and precise than the first reference voltage VREF1. Accordingly, the second reference voltage generation circuit 120 can consume more power than the first reference voltage generation circuit 111. The voltage level of first supply voltage VCC1 may be equal to the voltage level of the second supply voltage VCC2.

The analog MUX 113 outputs the second reference voltage VREF2 when the INV stand-by mode notification signal SBMOD is in a first logic state (for example, logic "low" state), and outputs the first reference voltage VREF1 when the IVC stand-by mode notification signal SBMOD is in a second logic state (for example, logic "high" state).

The voltage conversion circuit 115 converts a level of an output voltage of the analog MUX 113 to output the internal voltage IVCOUT.

Figure 2:
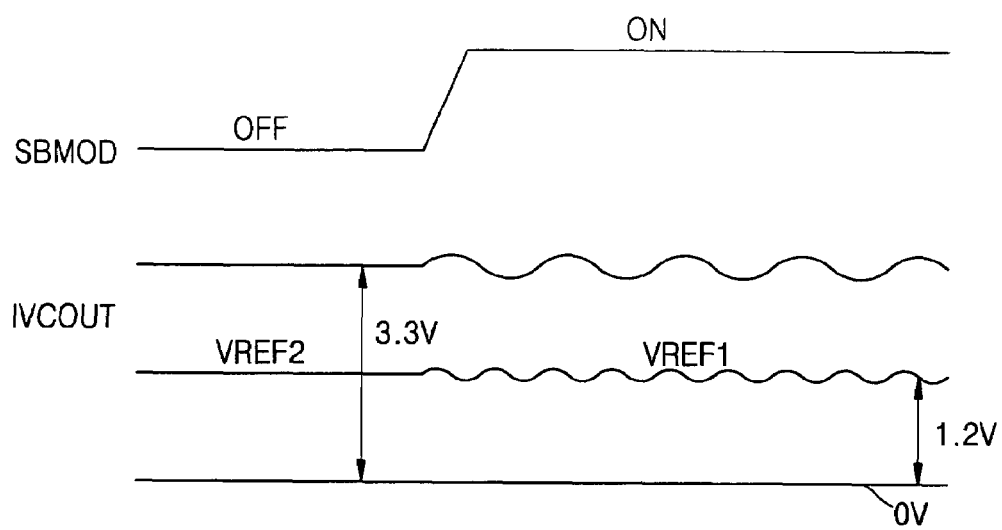
FIG. 2 is a waveform showing a relationship between an IVC stand-by notification signal and an output voltage of an analog MUX.

FIG. 2 is a waveform showing a relationship between the IVC stand-by mode notification signal SBMOD and the output voltage MUXOUT of the analog MUX. Referring to FIG. 2, in the IVC stand-by state, when the IVC stand-by mode notification signal SBMOD is maintained in the second logic state ("ON" state), it is sufficient to supply only a rough internal voltage IVCOUT to the core block 130. In the normal operation state, the IVC stand-by mode notification signal SBMOD is in the first logic state ("OFF" state), the analog MUX 113 outputs a more stable and precise voltage, e.g., of about 1.2 V as the second reference voltage VREF2, and the voltage conversion circuit 115 outputs a more stable and precise voltage of about 3.3 V as an internal voltage IVCOUT. Meanwhile, in the IVC stand-by state, the IVC stand-by mode notification signal SBMOD is in the second logic state ("ON" state), the analog MUX 113 outputs a less stable voltage of about 1.2 V as the first reference voltage VREF1, and the voltage converter 115 outputs a less stable voltage of 3.3 V as the internal voltage IVCOUT. Because the first reference voltage generation circuit 111 as well as the voltage conversion circuit 115 generate a less precise internal voltage IVCOUT than the second reference voltage generator circuit 115, less power is consumed in generating the internal voltage IVCOUT during standby mode.

Further, when the IVC stand-by mode notification signal SBMOD is in the first logic state, the first supply voltage VCC1 can be switched off so that the first supply voltage VCC1 is not supplied to the first reference voltage generation circuit 111 and accordingly the first reference voltage generation circuit 111 does not consume power. Likewise, when the IVC stand-by mode notification signal SBMOD is in the second logic state, the second supply voltage VCC2 can be switched off so that the second supply voltage VCC2 is not supplied to the second reference voltage generation circuit 120 and the second reference voltage generation circuit 120 does not consume power.

Figure 3:
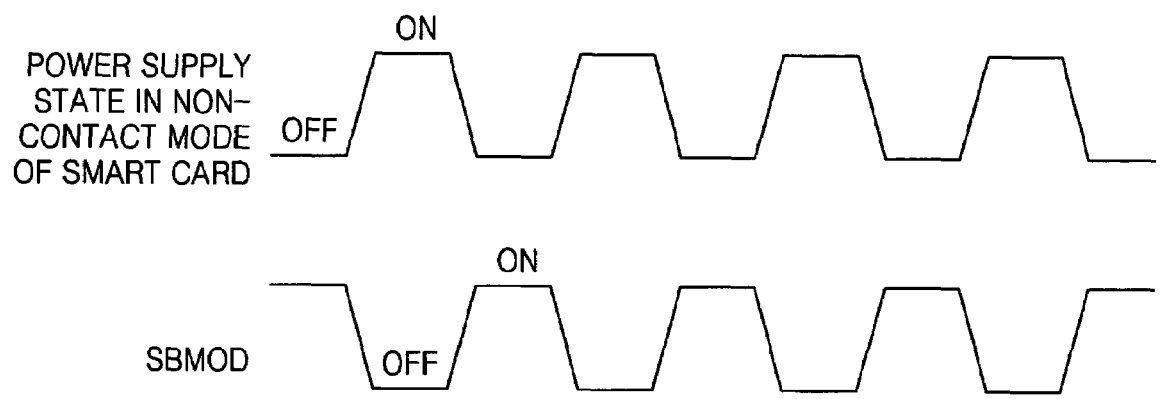
FIG. 3 is a waveform showing a relationship between the IVC stand-by notification signal and a signal indicating a power supply state in a non-contact mode of a smart card.

FIG. 3 is a waveform showing a relationship between the IVC stand-by mode notification signal SBMOD and a signal indicating a power supply state in a non-contact mode of a smart card. Referring to FIG. 3, when the internal voltage converter 110 drives a core block of a smart card, if a pulse signal is wirelessly received in the non-contact mode of the smart card, the IVC stand-by mode notification signal SBMOD is maintained in the second logic state ON while no power is applied ("OFF" periods of FIG. 3). SBMOD is maintained ON because if the internal voltage converter 110 receives the second reference voltage VREF2 and generates the internal voltage IVCOUT while no power is supplied, the core block of the smart card can receive power wirelessly and there is consumption of power during its operation. The operation of the smart card is well known and the detailed description thereof is omitted.

Figure 4:
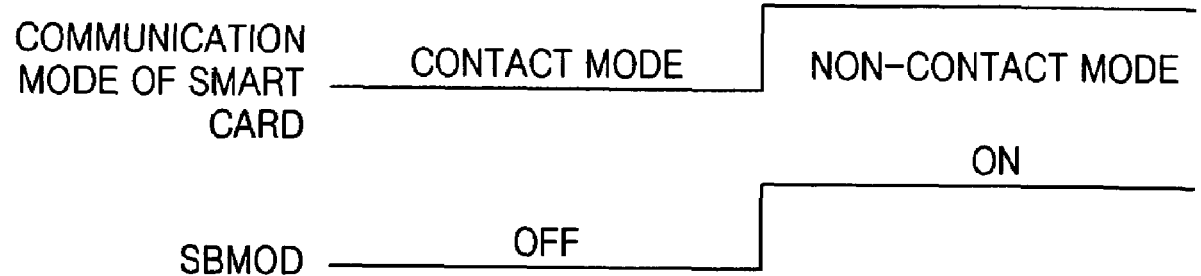
FIG. 4 is a waveform showing a relationship between the IVC stand-by notification signal and a communication mode of a smart card.

FIG. 4 is a waveform showing a relationship between the IVC stand-by mode notification signal and a communication mode of a smart card such as a combi-type smart card. Referring to FIG. 4, when the internal voltage converter 110 drives the core block 130 of the smart card, the IVC stand-by mode notification signal SBMOD is maintained in the first logic state OFF in a contact mode of the smart card and the IVC stand-by mode notification signal SBMOD is maintained in the second logic state ON in the non-contact mode of the smart card. Thus, the internal voltage converter 110 does not receive the second reference voltage VREF2 in the non-contact mode. This is to avoid receiving power wirelessly in the core block of the smart card while receiving internal voltage INCOUT during its operation.

A semiconductor device according to the present invention uses the internal voltage converter which discriminates the IVC stand-by state from the normal operation state, selects a voltage reference with low power consumption among selective voltage references in the IVC stand-by state and generates an internal voltage. Therefore, power consumption of a semiconductor device is efficiently reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A smart card, comprising:
a core block powered by an internal voltage; and
an internal voltage converter (IVC) for providing the internal voltage, comprising:
a first reference voltage generation circuit, which generates a first reference voltage that has a rough voltage waveform;
a second reference voltage generator circuit, which generates a second reference voltage that has a stable voltage waveform, wherein the first reference voltage generation circuit consumes less power than the second reference voltage generation circuit;
an analog MUX receiving an IVC stand-by identification signal, which outputs the second reference voltage when the IVC stand-by mode notification signal is in a first logic state, when an active state occurs during a normal operation state and the smart card is in a contact mode, and outputs the first reference voltage when the IVC stand-by mode notification signal is in a second logic state, when an idle state occurs during the normal operation state or the smart card is in a non-contact mode; and
a voltage conversion circuit, which converts a level of an output voltage of the analog MUX and generates the internal voltage as a stable waveform, increased voltage when the IVC stand-by mode notification signal is in the first logic state, and as a rough waveform, increased voltage when the IVC stand-by mode notification signal is in the second logic state.

2. The smart card of claim 1, wherein the first reference voltage generation circuit is powered by a first power supply, the second reference voltage generation circuit is powered a second power supply, and the first and second power supplies are provided wirelessly for a standard smart card and through electrical contacts for a combi-type smart card.

3. The smart card of claim 1, wherein the IVC stand-by mode notification signal is maintained in the second logic state IVC stand-by state period upon entering the normal operation state after power-on.

4. The smart card of claim 1, wherein the IVC stand-by mode notification signal is maintained in the second logic state when power is received wirelessly in the non-contact mode.

5. The smart card of claim 1, wherein the IVC stand-by mode notification signal is maintained in the second logic state in a non-contact mode of a combi-type smart card when the internal voltage converter outputs an internal voltage which drives the core block of the combi-type smart card.

6. The smart card of claim 2, wherein the first power supply is cut off when the IVC stand-by mode notification signal is in the first logic state, and the first reference voltage generation circuit does not generate the first reference voltage.

7. The smart card of claim 2, wherein the voltage level of the first power supply is equal to the voltage level of the second power supply.

8. The smart card of claim 2, wherein the second power supply is cut off when the IVC stand-by mode notification signal is in the second logic state, and the second reference voltage generation circuit does not generate the second reference voltage.

9. A semiconductor device comprising:
an internal voltage converter (IVC), which generates a first reference voltage that has a rough voltage waveform and a second reference voltage that has a stable voltage waveform for selection in response to a logic state of an IVC stand-by mode notification signal, and generates an internal voltage; and
a core block in a smart card, which receives the internal voltage to operate in a normal mode and in a stand-by mode,
wherein the internal voltage converter comprises:
a first reference voltage generation circuit, which generates the first reference voltage using a first supply voltage;
an analog MUX receiving an IVC stand-by identification signal, which outputs the second reference voltage when the IVC stand-by mode notification signal is in a first logic state, when an active state occurs during a normal operation state and the smart card is in a contact mode, and outputs the first reference voltage when the IVC stand-by mode notification signal is in a second logic state, when an idle state occurs during the normal operation state or the smart card is in a non-contact mode; and a voltage conversion circuit, which converts a level of an output voltage of the analog MUX and generates the internal voltage as a stable waveform, increased voltage when the IVC stand-by mode notification signal is in the first logic state, and as a rough waveform, increased voltage when the IVC stand-by mode notification signal is in the second logic state.

10. The semiconductor device of claim 9, wherein the internal voltage converter further comprises:

a second reference voltage generation circuit, which generates the second reference voltage using a second supply voltage, wherein the first reference voltage generation circuit consumes less power than the second reference voltage generation circuit.

11. An internal voltage conversion method to supply a core block of a smart card comprising:

(a) generating a first reference voltage that has a rough voltage waveform using a first supply voltage;

(b) generating a second reference voltage that has a stable voltage waveform and that consumes more power than the step of generating the first reference voltage;

(c) receiving an internal voltage converter (IVC) stand-by identification signal;

(d) outputting the second reference voltage when the received IVC stand-by mode notification signal is in a first logic state, when an active state occurs during a normal operation state and the smart card is in a contact mode, and outputting the first reference voltage when the IVC stand-by mode notification signal is in a second logic state, when an idle state occurs during the normal operation state or the smart card is in a non-contact mode;

(e) converting a voltage level of one of the outputted first reference voltage or the outputted second reference voltage and generating an internal voltage as a stable waveform, increased voltage when the IVC stand-by mode notification signal is in the first logic state, and as a rough waveform, increased voltage when the IVC stand-by mode notification signal is in the second logic state.

12. The internal voltage conversion method of claim 11, further comprising:

generating the second reference voltage using a second supply voltage.

13. The internal voltage conversion method of claim 11, wherein the IVC stand-by mode notification signal is maintained in the second logic state in an IVC stand-by state period upon entering the normal operation state after power-on.

14. The internal voltage conversion method of claim 11, wherein the IVC stand-by mode notification signal is maintained in the second logic state when power is received wirelessly in a non-contact mode of the smart card.

15. The internal voltage conversion method of claim 11, wherein the IVC stand-by mode notification signal is maintained in the second logic state when the core block of a combi-type smart card is in a non-contact mode.

16. The internal voltage conversion method of claim 11, wherein the first supply voltage is cut off when the IVC stand-by mode notification signal is in the first logic state, and the first reference voltage is not generated.

17. The internal voltage conversion method of claim 12, wherein the first supply voltage is equal to the second supply voltage.

18. The internal voltage conversion method of claim 12, wherein the second supply voltage is cut off when the IVC stand-by mode notification signal is in the second logic state, and the second reference voltage is not generated.

19. A method for driving a smart card, comprising:

generating a first reference voltage having a rough voltage waveform using a first supply voltage and a second reference voltage that has a stable voltage waveform and that consumes less power to generate than the first reference voltage;

receiving an IVC stand-by identification signal;

selecting one of the first reference voltage or the second reference voltage in response to a logic state of the IVC stand-by mode notification signal to generate an internal voltage to supply a core block of the smart card;

outputting the second reference voltage when the IVC stand-by mode notification signal is in a first logic state, when an active state occurs during a normal operation state and the smart card is in a contact mode, and outputting the first reference voltage when the IVC stand-by mode notification signal is in a second logic state, when an idle state occurs during the normal operation state or the smart card is in a non-contact mode; and converting a voltage level of one of the output first reference voltage or the output second reference voltage, and generating the internal voltage as a stable waveform, increased voltage when the IVC stand-by mode notification signal is in the first logic state, and as a rough waveform, increased voltage when the IVC stand-by mode notification signal is in the second logic state.

20. The method of claim 19, wherein the step of generating further comprises:

generating the second reference voltage using a second supply voltage.

* * * * *